(12) United States Patent
Michalek et al.

(10) Patent No.: US 8,327,755 B1
(45) Date of Patent: Dec. 11, 2012

(54) BEVERAGE BREWER WITH POWER DRIVEN TUBULAR HOT WATER DISPENSE VALVE AND METHOD

(75) Inventors: Christopher P. Michalek, Lake Zurich, IL (US); Zbigniew G. Lassota, Long Grove, IL (US)

(73) Assignee: Food Equipment Technologies Company, Inc., Lake Zurich, IL (US)

( * ) Notice: Subject to any disclaimer, the term of this patent is extended or adjusted under 35 U.S.C. 154(b) by 626 days.

(21) Appl. No.: 12/477,247

(22) Filed: Jun. 3, 2009

Related U.S. Application Data

(60) Provisional application No. 61/059,625, filed on Jun. 6, 2008.

(51) Int. Cl.
*A47J 31/057* (2006.01)
*A47J 31/40* (2006.01)

(52) U.S. Cl. .............................. 99/300; 99/280; 99/283

(58) Field of Classification Search .................. 99/280, 99/281, 282, 283, 286, 287, 288, 289, 290
See application file for complete search history.

(56) References Cited

U.S. PATENT DOCUMENTS

| | | | | |
|---|---|---|---|---|
| 4,621,571 A | * | 11/1986 | Roberts | 99/280 |
| 5,000,082 A | * | 3/1991 | Lassota | 99/304 |
| 5,245,914 A | * | 9/1993 | Vitous | 99/280 |
| 5,584,229 A | * | 12/1996 | Anson | 99/280 |
| 5,644,972 A | * | 7/1997 | Dahmen et al. | 99/280 |
| 5,676,040 A | * | 10/1997 | Ford | 99/280 |
| 5,943,944 A | * | 8/1999 | Lassota | 99/280 |
| 5,953,981 A | * | 9/1999 | Lassota | 99/281 |
| 6,035,761 A | * | 3/2000 | Lassota | 99/286 |
| 6,135,009 A | * | 10/2000 | Lassota | 99/290 |
| 6,148,717 A | * | 11/2000 | Lassota | 99/283 |
| 6,543,335 B1 | * | 4/2003 | Lassota | 99/283 |
| 6,571,685 B1 | * | 6/2003 | Lassota | 99/283 |
| 6,706,300 B1 | * | 3/2004 | Lassota | 426/433 |
| 6,713,109 B1 | * | 3/2004 | Lassota | 426/435 |
| 6,829,981 B2 | * | 12/2004 | Lassota | 99/299 |
| 6,931,984 B2 | * | 8/2005 | Lassota | 99/280 |

* cited by examiner

*Primary Examiner* — Kien Nguyen
(74) *Attorney, Agent, or Firm* — James W. Potthast; Potthast & Associates

(57) ABSTRACT

An electrical beverage brewer (10) having a controller (26) responsive to a start switch (72) to operate a brew cycle by dispensing hot water from a tank (42) to beverage ingredient within a brew basket (38) through a bent tube (78) mounted to the water tank (42) for rotation about an axis aligned with an external horizontal rotary section (90) of the bent tube (78) between a closed position in which an inlet (80) of a swinging tubular section (79) is in a relatively elevated, closed position and an open position at a lower elevation relative to the closed position. A rotary electromechanical solenoid (96), a pneumatic rotary solenoid (134) or a stepper motor (126) or other like rotary, drive mechanism requiring no positional sensors has a rotary axis aligned with the central axis of rotation of the rotary section (90) and axially linked, inline, with the rotary section (90) to axially drive the rotary section (90) and thereby move the swinging section (79) between the open position and the closed position without applying lateral forces to the rotary section (90).

25 Claims, 7 Drawing Sheets

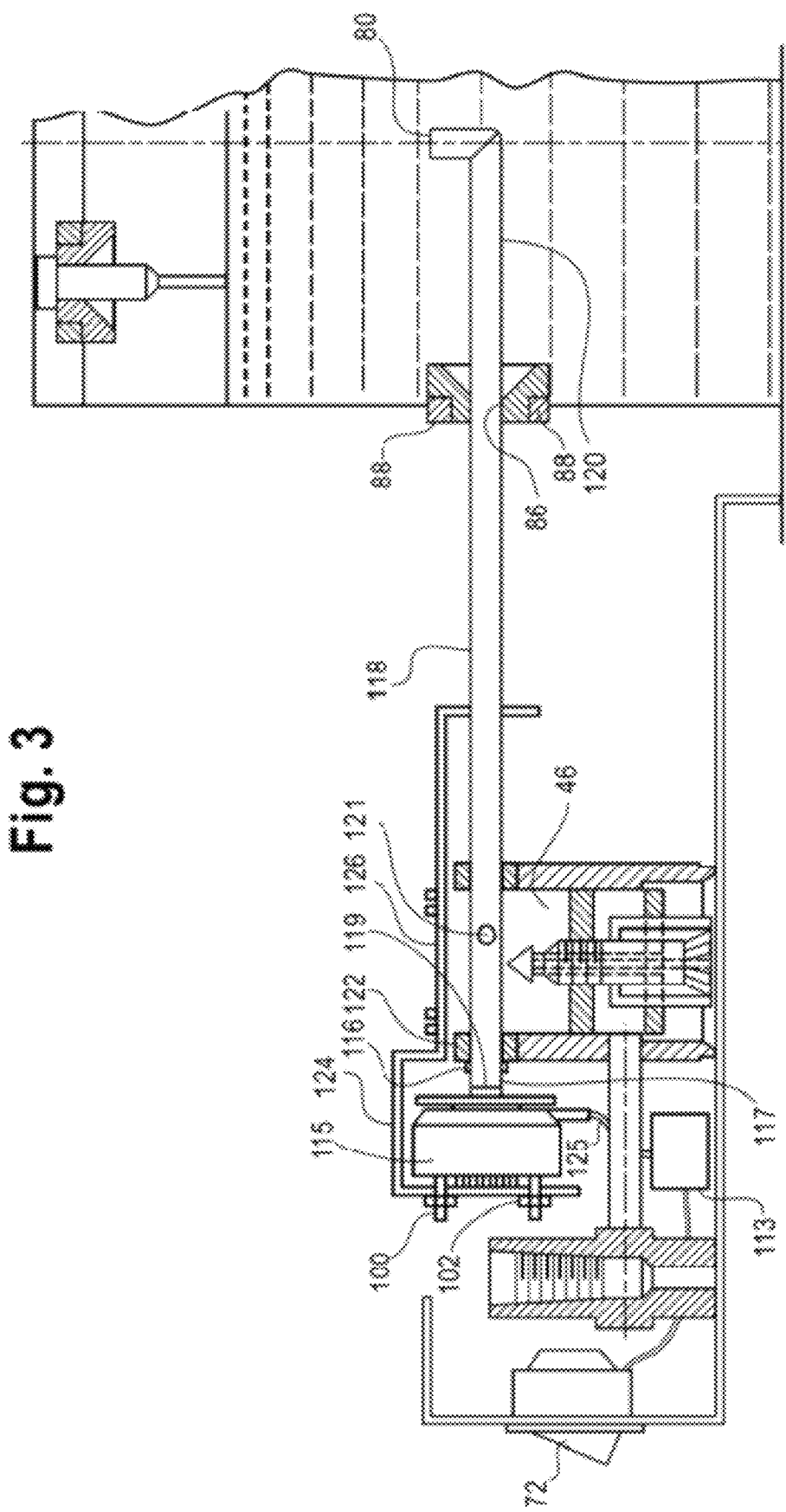

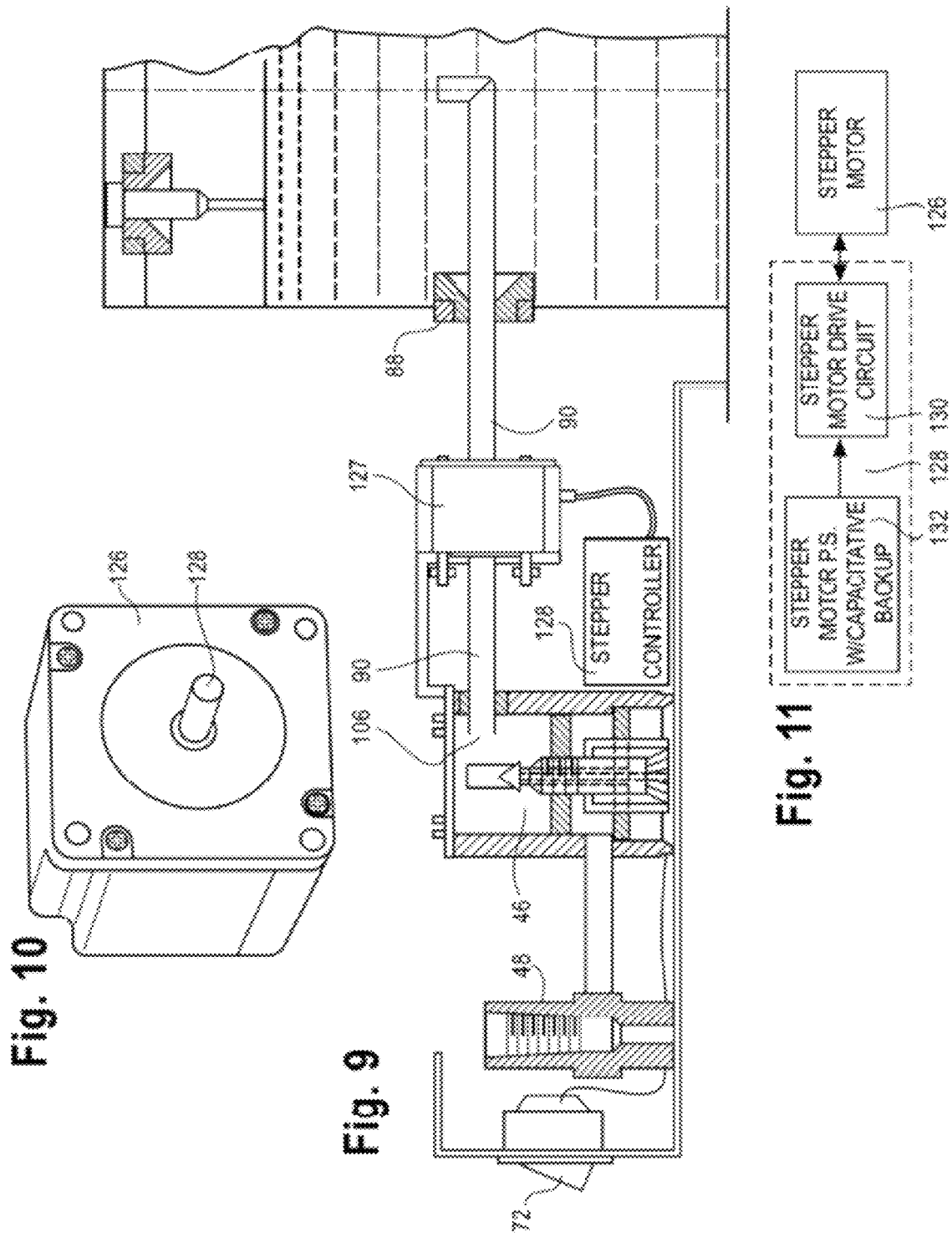

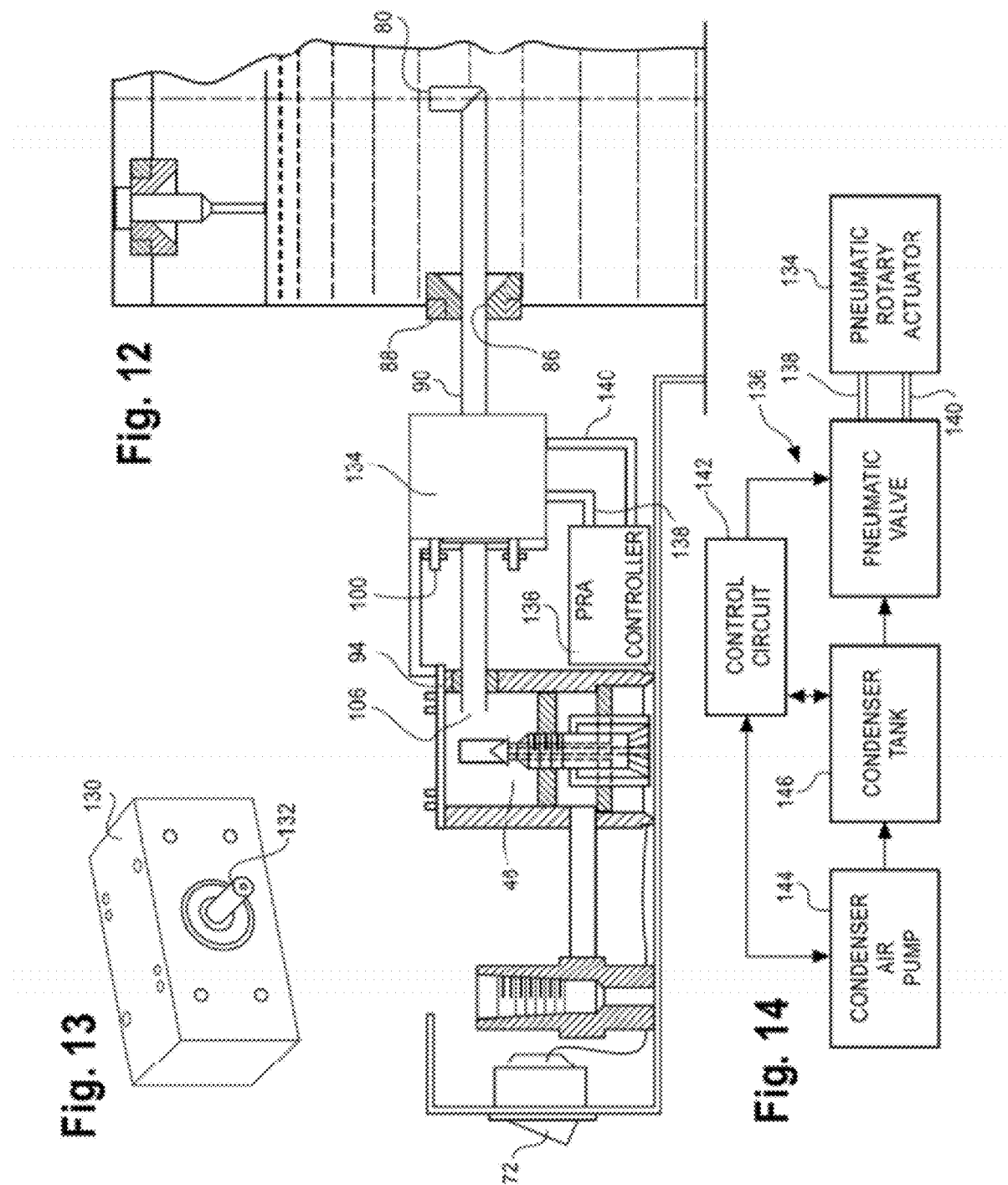

BEVERAGE BREWER WITH POWER DRIVEN TUBULAR HOT WATER DISPENSE VALVE AND METHOD

CROSS-REFERENCE TO RELATED APPLICATION

This application claims the benefit under 35 U.S.C. 119(e) of provisional patent application No. 61/059,625, filed Jun. 6, 2008, which is hereby incorporated by reference.

DISCUSSION OF THE PRIOR ART

1. Field of the Invention

This invention generally relates to electrical beverage brewers and more particularly to such brewers that dispense water from a water tank onto dry beverage ingredient through a rotating tubular dispense valve.

2. Discussion of the Prior Art

In the beverage brewer of the U.S. Pat. No. 5,000,082, filed Jul. 27, 1988, of one of the present co-inventors and entitled, "Beverage Maker and Method of Making Beverage", a dispense valve with an L-shaped tubular dispense tube is shown with an interior swinging portion with an inlet and a horizontal exterior portion with an outlet. The exterior tubular portion is rotated by means of a reversing electronic motor to selectively swing the interior swinging portion between a closed position in which the inlet is above the surface of the water in a water tank and an open position in which the inlet is beneath the surface to drain water through the inlet and tubular dispense tube for discharge from the outlet and into a drain chamber.

While this tubular dispense valve operated successfully, it suffered from some problems that this invention is intended to overcome or ameliorate. The operation of the rotary, reversing, electric motor was controlled in accordance with cam actuated microswitches. The microswitches were operated by a cam attached to and rotating with the distal end of the exterior horizontal portion of the tube located between the hot water tank and the drain chamber. The microswitches were necessary to determine when the motor had rotated a sufficient amount to place the inlet into the closed position above the surface of the hot water and then again when the reversing electric motor had rotated sufficiently in the opposite direction to move the inlet to the open position beneath the surface of the hot water. The motor was operatively connected to the exterior, horizontal portion of the tube by means of a drive linkage including a gear surrounding and attached the tube and laterally linked with a meshing gear rotating with and attached to the rotary axle of the reversible, rotary electrical drive motor.

This reversing electrical motor and cam operated microswitch control system was prone to reliability problems because of inherent maintenance problems of the microswitches, the reversible electrical motors, themselves and the laterally connected mechanical geared linkage. The rotary tubular valve assembly also suffered from uneven wear and the rotary water tight seals surrounding and supporting the rotary portions of the tubular valve at the hot water tank and at the drain chamber deteriorated rapidly and lost their seals due to the lateral forces applied to the seals by the exterior rotary portions of the tube by the motor and laterally connected gear linkage between the motor and the tube.

SUMMARY OF THE INVENTION

It is therefore an object of the present invention to provide a beverage brewer with a rotary, tubular dispense valve assembly and associated power drive and method of brewing employing same that overcomes the problems noted above.

This object is achieved in part by provision of an electrical beverage brewer having, a start brew switch, a controller responsive to the start switch to operate a brew cycle, a water tank and means for holding beverage ingredient, the improvement being a water dispense system for selectively passing water from the water tank to the beverage holding means with a rotary, tubular valve with an elongate, non-straight, tubular body with an interior, swinging section joined to an exterior rotary section, said interior swinging section having an inlet opening and said rotary section having a central axis of rotation, and an outlet opening in fluid communication with the inlet opening and; means for mounting the tubular body to the water tank for rotation about an axis aligned with the rotary section, between an closed position in which the inlet is in a relatively elevated, closed position and an open position at a lower elevation relative to the closed position, said tubular body being mounted with the swinging section and inlet located within the water tank and at least a part of the rotary section located without the water tank with the outlet in fluid communication with the brew basket to pass water to the brew basket; and an inline, rotary, drive mechanism having a rotary axis aligned with the central axis of rotation of the rotary section and axially linked, inline, with the rotary section to axially drive the rotary section and thereby move the swinging section between the open position and the closed position without applying lateral forces to the rotary section.

Preferably, the beverage brewer includes a drain chamber with a water tight inlet for rotatable connection with, and receipt of water from, the exterior rotary section, and a bottom opening for distributing the water from the inlet to the brew basket.

In one embodiment, the exterior rotary section extends entirely through the center of the inline, rotary drive mechanism, and the outlet is an outlet opening located on a side of the rotary solenoid that is opposite the interior swinging section. In another embodiment the outlet is an axially facing opening at the end of the exterior rotating section. In another embodiment the exterior rotary section passes entirely through the drain chamber from one side to an opposite side of the drain chamber, the outlet opening faces laterally from a side of the exterior rotary section, the exterior rotary section has a closed end that is located without the drain chamber and connected axially inline with the inline, rotary drive mechanism, and the drain chamber is located between the inline, rotary drive mechanism and the water tank.

In yet another embodiment the outlet opening is defined by an opening at a distal end of the exterior, rotary section that is located within the drain chamber, the water tight inlet is located between the inline, rotary drive mechanism and the water tank, the inline, rotary drive mechanism is attached to the exterior, rotary section with an elongate bracket with one end connected to the rotary drive mechanism, and another end connected to the exterior, rotary section at a location between the water tight inlet and the water tank. Preferably, the elongate bracket has a generally L-shaped portion, and an axis of rotation that is aligned with the central axis of rotation of the exterior rotary section. The elongate bracket is defined by a pair of arms slidably interconnected together to reduce axial forces being imposed on the exterior rotary section and the inline rotary drive mechanism. An open water distribution member of the drain chamber is located between the drain chamber inlet and the brew basket to spread the water across an open top of the brew basket.

Preferably, the inline rotary drive mechanism is an electromechanical rotary solenoid, said rotary solenoid automatically rotating the exterior rotary section though an arc of preselected size when energized to move the swinging section to the open position, and automatically returning the exterior rotary section through the same arc to move the swinging section to the closed position when not energized.

Alternatively, the inline rotary drive mechanism is a stepper motor, said stepper motor automatically rotating the exterior rotary section though an arc of preselected size when energized with a preselected number of electrical pulses of a preselected polarity to move the swinging section to the open position from the closed position, and automatically returning the exterior rotary section through the arc of preselected sized when energized with the preselected number of electrical pulses of another polarity opposite the preselected polarity to move the swinging section from the closed position to the open position. The controller has means for selectively generating the preselected number of pulses of the preselected polarity in response to actuation of a start brew switch. The stepper motor controller has a drive circuit for generating the pulses of both preselected polarities, and an AC powered stepper motor DC power supply with a capacitance backup power supply to enable the stepper motor drive circuit to generate pulses of the polarity opposite to the preselected priority to return the swinging section to the closed position in the event of loss of AC power.

Alternatively, the inline, rotary drive mechanism is a pneumatic rotary solenoid, said pneumatic rotary solenoid rotating the exterior rotary section though an arc of preselected size when energized with pressure to move the swinging section to the open position, and automatically rotating the exterior rotary section to move the swinging section to the closed position when not energized with pressure. A pneumatic controller has a pneumatic valve connected to the rotary solenoid for selectively applying pressure to the pneumatic solenoid from a pressurized air condenser tank in response to signals from the controller.

In the case of the embodiments employing rotary solenoids an advantage is that the rotary solenoid rotates the exterior rotary section though an arc of preselected size when energized to move the swinging section to the open position, and automatically rotating the exterior rotary section through the same arc to move the swinging section back to the closed position when not energized. There is no need for microswitches or other like position sensors or controllers because the arc traveled by the solenoid when being switched from energized to not energized remains fixed and know and is inherent in the design of the rotary solenoid.

Similarly, when the inline rotary drive mechanism is a stepper motor, the stepper motor automatically rotates the exterior rotary section though an arc of preselected size when energized with a preselected number of electrical pulses of a preselected polarity to move the swinging section to the open position, and automatically rotating the exterior rotary section to move the swinging section to the closed position when energized with a preselected number of electrical pulses of another polarity opposite the preselected polarity. Accordingly, there is no need for microswitches or other positional sensors because the amount of rotation by the stepper motor for a given number of control pulses is fixed and known.

The objective of the invention is also achieved by providing for use in an electrical beverage brewer having, a start brew switch, a controller responsive to the start switch to operate a brew cycle, a water tank and a brew basket for holding beverage ingredient, the improvement being a water dispense system for selectively passing water from the water tank to the brew basket, a method of brewing by performance of the steps of (1) mounting a generally bent dispense tube to a water tank for rotation from a closed position in which the inlet is in a relatively elevated, closed position and an open position at a lower elevation relative to the closed position, said tubular body being mounted with the swinging section and inlet located within the water tank and at least a part of the rotary section located without the water tank with the outlet in fluid communication with the brew basket to pass water to the brew basket; and (2) rotating the exterior rotating section with a powered inline, rotary, drive mechanism with a rotary axis aligned with the central axis of rotation of the rotary section and axially linked, inline, with the rotary section to axially drive the rotary section and thereby move the swinging section between the open position and the closed position without application of lateral forces to the rotary section; (3) holding the rotary section stationary with the swinging section in the open position to pass a preselected amount water to the brew basket through the bent dispense tube from the water tank to the brew basket; and (4) after the preselected quantity of water has been passed to the brew basket, rotating the exterior rotating section with the powered, inline, rotary, drive mechanism to axially drive the rotary section and thereby move the swinging section from the open position to the closed position without application of lateral forces to the rotary section.

Preferably, the step of rotating the swinging section to the closed position includes the steps of manually actuating a start brew switch, and energizing the inline, rotary drive mechanism in response to actuation of the start switch. The step of passing the water to the brew basket includes the step of passing the water out of a laterally facing outlet in the exterior rotating section. The step of passing includes the step of passing water from an outlet of the exterior rotary section into a drain chamber located above the brew basket to which the exterior rotary section is rotatably mounted. Again, preferably, the steps of rotating are performed with a rotary solenoid with an axis of rotation that is aligned with a central axis of rotation of the exterior rotary section. The exterior rotary section is rotatably mounted to one side of a drain chamber, and the steps of rotating includes the steps of rotating the exterior rotary section with the inline rotary drive mechanism located on a side of the drain chamber opposite the one side with a rotary bracket laterally engaging the exterior rotary section on the one side.

The object is also acquired in part by provision in an electrical beverage brewer having a water tank and a brew basket for holding beverage ingredient of a water dispense system for selectively passing water from the water tank to the brew basket, having a rotary tubular valve with an elongate, non-straight, tubular body with an elongate interior swinging section joined to an exterior rotary section, said interior swinging section having an inlet opening and said rotary section having a central axis of rotation, and an outlet opening in fluid communication with the inlet opening; and means for mounting the tubular body to the water tank for rotation about an axis of rotation aligned with the rotary section, between a closed position, in which the inlet is in a relatively elevated position, and an open position at a lower elevation relative to the closed position; and means for automatically driving the rotary section with a solenoid by energizing the solenoid, said solenoid imparting a preselected fixed amount of rotary movement to the exterior rotary section in one direction to move the inlet from the closed position to the open position and imparting a preselected fixed amount of rotary movement in an opposite direction to move the inlet from the open position to the closed position to pass water to the brew basket from the water tank.

Preferably, the automatically driving means includes means for selectively automatically inline, axially, driving the rotary section with a rotary member having a rotary axis aligned with the axis of rotation and imparting an inline, axial, opposite rotary drive to the exterior rotary section to return the inlet to the open closed position, and the automatically inline driving means is responsive to actuation of a start brew switch to move the inlet to the open position. In one embodiment the automatically inline driving means is rotary solenoid, and in another embodiment the automatically inline driving means is a rotary stepper motor. In some instances, the automatically inline driving means has a stator and the exterior rotary section extends into the stator and functions as, and interacts with the stator as a rotor. The exterior rotary section may pass entirely through the stator.

Alternatively, an elongate coupler links the inline driving means to the exterior rotary section to impart the inline, axial, rotary drive force having an axis of rotation aligned with the rotary axis of the rotary member and the axis of rotation of the inline automatically driving means. The coupler includes a circular connector through which the rotary section snugly fits lying in a plane perpendicular to the rotary axis and an elongate arm connected at one end to the circular connector and connected at another end to the automatically inline driving means.

Acquisition of the objective of the invention is also achieved by providing a method of dispensing water from a water tank to an ingredient holder for use in an electrical beverage brewer having a water tank and a brew basket for holding beverage ingredient, by performing the method steps of providing a rotary, tubular valve with an elongate, non-straight, tubular body with an elongate interior swinging section joined to an exterior rotary section, said interior swinging section having an inlet opening and said rotary section having a central axis of rotation, and an outlet opening in fluid communication with the inlet opening; mounting the tubular body to the water tank for rotation about an axis of rotation aligned with the rotary section, between a closed position, in which the inlet is in a relatively elevated position, and an open position at a lower elevation relative to the closed position; and automatically driving the rotary section with a solenoid by energizing the solenoid, said solenoid imparting a preselected fixed amount of rotary movement to the exterior rotary section in one direction to move the inlet from the closed position to the open position when energized, and imparting a preselected fixed amount of rotary movement in an opposite direction to move the inlet from the open position to the closed position to pass water to the brew basket from the water tank when the energization is terminated.

BRIEF DESCRIPTION OF THE DRAWINGS

The forgoing objects, features and advantages of the present invention will be described in detail and other objects, features and advantages will be made apparent from the detailed description provided below that is given with reference to the reference to the several figures of the drawing, in which:

FIG. 3 is an enlarged portion of another version of the beverage brewer that is substantially the same as the beverage brewer of FIG. 1 but which employs an in-line, axial, power driven, close-ended, tubular dispense valve that passes through the drain chamber for releasable, threaded, axial connection with a rotary axle of an unmodified, rotary solenoid and passes hot water into the chamber through an intermediated laterally facing dispense outlet hole;

FIG. 9 is a side sectional view of a another embodiment of the beverage brewer of the present invention which is the same as that of FIGS. 1 and 2 except for substitution of the rotary solenoid with an in-line, axial, power driven, open-ended tubular dispense valve in which an open-ended dispense tube has been substituted for, and functions as, the rotary axle of a stepper motor and which dispenses hot water into a drain chamber from the open end of the tubular valve;

FIG. 10 is a perspective view of the electric stepper motor of FIG. 10;

FIG. 11 is a functional block diagram of the stepper motor circuitry of FIG. 9 that is used together with the stepper motor;

FIG. 12 is a side sectional view of another embodiment of the beverage brewer of the present invention which is the same as that of FIGS. 1 and 2, except for substitution of the rotary solenoid with an in-line, axial, power drive, open-ended tubular dispense valve in which an open-ended dispense tube has been substituted for, and functions as, the rotary axle of a pneumatic rotary actuator;

FIG. 13 is a perspective view of the pneumatic rotary actuator of FIG. 12; and

FIG. 14 is a functional block diagram of the pneumatic rotary actuator controller shown as a single block in FIG. 13;

DETAILED DESCRIPTION

Figure 1:
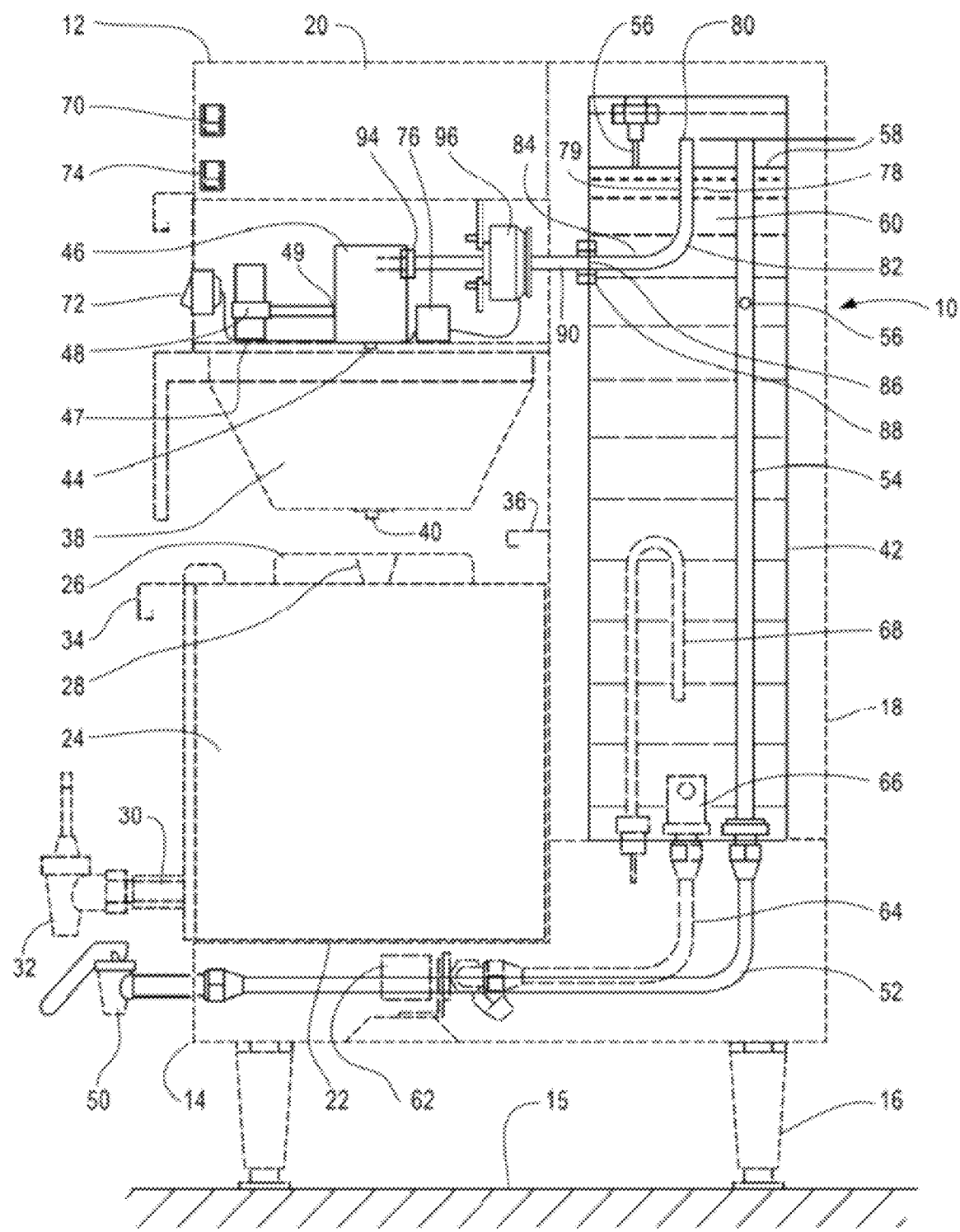
FIG. 1 is a side sectional view of a preferred embodiment of the beverage brewer of the present invention that employs an in-line, axial, power driven, open-ended, tubular dispense valve in which an open-ended dispense tube has been substituted for, and functions as, the rotary axle of a rotary solenoid, and which dispenses hot water into a drain chamber from the open end of the tubular valve.

Referring to FIG. 1 of the drawings, the preferred embodiment of the beverage brewer 10 of the present invention is seen to have a stainless, sheet metal housing 12 that includes a base section 14 supported above a counter surface 15 on four substantially identical legs 16. Supported above the base section is a rearwardly located, upstanding intermediate section 18 which, in turn, cantilever supports an upper section 20. The base section 14 has an upwardly facing shelf 22 upon which is removably supported an insulated, stainless steel, beverage dispenser 24 which can hold approximately 1.5 gallons of beverage and is especially adapted to fit snugly beneath a brew basket 38 for direct receipt of beverage. The beverage dispenser 24 has an opening at the top with a closure member 26, which, in turn, has a funnel shaped opening 28 located directly beneath a drain hole 40 of the brew basket for direct receipt of freshly brewed coffee, tea or the like. The dispenser 24 has an outlet 30 to which is attached to a manually operated faucet 32 for dispensing beverage into individual size serving containers, such as a coffee cup or the like (not shown). After each brew cycle the dispenser 24 may be removed using handles 34 and 36 and relocated to a serving station and a different, empty dispenser substituted in its place for receipt of a new batch of coffee during a new brew cycle.

During a brew cycle, the dispenser 24 is located directly beneath the drain hole 40 of the brew basket 38 from out of which drains hot, freshly brewed beverage. Contained within the brew basket 38 is a cup shaped, wire filter holder which supports a paper coffee filter or permanent filter (not shown) within which is supported a preselected quantity of ground coffee beans, tea or other like ingredient to be brewed. During a brew cycle, hot water from a hot water tank 42 contained within the rearward, upstanding housing section 18 is passed into the brew basket 38 through an outlet 44 of a drain chamber 46 located directly over the center of the filter paper and ground coffee. The hot water percolates through the ground coffee beans or the like to extract the flavor components of the dry beverage ingredient to make the freshly brewed beverage.

In addition, another stream of hot bypass water may be passed into the brew basket 38 through an outlet opening 47 of bypass valve 48 connected to the drain chamber via a pipe 49. The outlet opening 47 is positioned adjacent the perimeter of the brew basket 38 bypasses the filter paper and beverage ingredient and passes directly into the brew basket and is mixed with the beverage in the dispenser to dilute the beverage as may be desired.

A hot water faucet 50 which is connected though a pipe is also attached to the base section 14 of the housing 12 which, in turn, is connected to a hot water drain pipe 54 contained within the hot water tank and having a submerged hot water inlet 56 located above the bottom of the tank for transferring hot water from the tank to the hot water pipe 52. A level sensor 56 located adjacent the top of the hot water tank senses when the actual surface level 58 of the hot water 60 falls beneath a preselected minimum level, and when this occurs, a controller 76 responsive to the level sensor 56 actuates a solenoid fill valve 62 adjacent the bottom of the tank that receives unheated water from a public water supply through a suitable threaded fitting (not shown) and passes it through a pipe 64 and an unheated outlet fitting 66 into the bottom of the hot water tank 18. When the surface level 58 returns to the preselected level, the solenoid controlled inlet valve 62 is closed.

The temperature of the water is kept within a preselected range of temperatures by means of an electrical heating element 68 that is controlled by a thermostat with temperature sensors within the hot water tank (not shown). A control switch 70 that can lockout the start brew switch 72 and a control switch 74 are mounted on the interior of the upper housing 20. The microcomputer based controller 76 is also mounted within the upper housing section 20 and is connected to and controls or responds to the solenoid controlled valve 62, the level sensor 56, the temperature sensors, the electrical heating element 68, the power switch 70 and control switch 74 and the start switch 72 to control the normal brewing operation. There may be other sensors for safety purposes that sense whether a dispenser 24 and the brew basket 38 are in their proper positions to which the controller may respond to prevent the start of a brew cycle when they are not in position.

The details of the controller and the operation and programming of parameters such as batch size, bypass percentage, temperature, etc. into the controller and other standard features of the beverage brewer 10 and its mating dispenser form no part of the present invention. Such other features or a more detailed explanation of the features described here may be found in U.S. Pat. Nos. 5,000,082 issued Mar. 19, 1991 to Zbigniew G. Lassota, one of the current co-inventors, for an invention entitled, "Beverage Maker and Method of Making Beverage", which is hereby incorporated by reference. A description of other commercial coffee brewers, hot tea brewers, iced tea brewers or other beverage makers with which the present invention is compatible and with which the current invention may be successfully be employed besides those described here or in U.S. Pat. No. 5,000,082, may be found in U.S. Pat. Nos. 6,148,717, "Beverage Maker with Intermittent Beverage Liquid Dispenser and Apparatus and Method for Uniform Contact of Brew Ingredient with Brew"; 6,829,981, "Coffee Brewer with Independent Control of Dispense Period and Batch Quantity and Method"; 5,943,944, "Brewing System with Water Urn Flushing Apparatus"; 6,035,761, "Brewing System with Hot Water Holding Tank Flushing Apparatus and Holding Tank Preheating Method"; 6,135,009, "Brewing System with Dispenser Urn Loading Apparatus and Method"; 5,953,981, "Brewing System with Electrical Controller and Method"; U.S. Pat. No. 6,543,335, "Brewing System with Electrical Controller and Method"; U.S. Pat. No. 6,706,300, "Brewing System With Movable Brew Basket Mounting Apparatus and Method"; 6,571,685, "Oxygenating Tea Maker and Method"; 6,713,109, "Method of Tea Extraction"; 6,829,981, "Coffee Brewer with Independent Control of Dispense Period and Batch Quantity and Method"; 6,931,984 Disablement Controlled Brewer and Method", all of which are hereby incorporated by reference.

The brew cycle that is employed with the beverage brewer 10 is preferably the intermittent, pulsed or pulse-brew cycle shown and described in U.S. Pat. Nos. 6,148,717, "Beverage Maker with Intermittent Beverage Liquid Dispenser and Apparatus and Method for Uniform Contact of Brew Ingredient with Brew" and the present invention is particularly well adapted to such a brew cycle in which the dispensing of hot water to the drain chamber and then to the brew basket during the hot water dispense period is intermittent or pulsed such that there must be multiple operations of a dispense valve during the dispense period. The invention is, however, also functions well and may be used to advantage with a hot beverage brew cycle during which the delivery of hot water is continuous throughout the dispense period of the brew cycle.

In U.S. Pat. No. 5,000,082, the dispense valve, i.e. the valve that is employed to selectively pass hot water 60 from the hot water tank 42 to the drain chamber 46 is a tubular dispense valve formed of a bent tube similar to the bent tube 78, of FIG. 1. As seen, the bent tube 78 has an interior swinging section 79 within the hot water tank 42. The interior swinging section 79 has an inlet opening 80. The swinging portion is moved to a position with the inlet opening 80 located above the surface 58 of the water 60 when the valve is in a closed position to prevent the passage of hot water into the inlet opening 80. At the same time, advantageously, steam in the hot water tank in the space above the surface 58 passes out of the space through the bent tube 78 to clean the tube. When the swinging section 79 is moved to a position in which the inlet opening 80 is located beneath the actual surface 58 of the hot water 60, the hot water flows into the tubular interior section 79 through the inlet opening 80.

The tubular swing section 79 is bent at an angle, preferably ninety degrees to form an arcuate shoulder 82 that connects the swinging section with the inlet opening 80 to a straight horizontal interior tubular portion 84 that is rotated about its major central axis to pivot the swinging section 79 between the open and closed positions. The horizontal interior, rotating portion 84 passes though a laterally facing tube opening 86 surrounded by a circular water tight seal 88 to prevent any leakage of hot water out though the opening 86. The water tight sealing bearing is preferably made of Teflon™ or of a Teflon™ coated material and is capable of many cycles of operation without deterioration.

The interior, swinging portion, or section, 84 is integrally formed with and aligned with a straight, exterior, horizontal rotary section 90 and is rotated thereby. The exterior horizontal rotating 90 has an open end or outlet 92 from which hot water that has passed through the various sections of the tubular valve 78 is discharged into the drain chamber 46. The body of the exterior section 90 passes through a round, sealed hole in the side of the drain chamber 46 that is surrounded by a water-tight sealing, circular bearing 94, similar to bearing 88, that prevent leakage out of the drain chamber.

In accordance with the present invention, the maintenance problems associated with electrical reversing motors and microswitches and the problem of leaky seals due to uneven wear caused by lateral forces from a laterally offset drive mechanism motor and laterally offset linkage to the motor are overcome. In accordance with the present invention, the use of a reversible electrical motor controlled by microswitches is eliminated by use of either an electromechanical or pneumatic rotary solenoid that travels through a preselected and fixed rotary arc each time it energized or de-energized and thus requires to positional sensors. Alternatively, the need for positional sensors is eliminated by use of a electrical stepper motor which travels through a preselected and fixed degrees of arc dependent solely upon the number of control pulses that are received. The application of lateral forces to the rotary tubular section is eliminated by employing an axial, in-line, power drive that employs no laterally engaging gears and which applies inline, rotary force to the rotary tubular section uniformly around the tube and only along the major axis of the rotary tubular section and not unevenly on one side or the other. As previously noted, the elimination of the lateral forces substantially reduces the uneven wear on the seals and thereby reduces leakage and enables successful operation of the tubular dispense valve with powered means in response to actuation of a start switch instead of by manual actuation that was previously required to avoid the maintenance problems not herein. The reduced wear and tear on the seals and related maintenance advantages of the manually operated tubular dispense valve shown in U.S. Pat. No. 5,331,885 issued to Zbigniew G. Lassota on Jul. 26, 1994, for an invention entitled, "Semiautomatic Beverage Maker and Method" are obtained while enabling automatic operation in response to actuation of a start switch as taught in U.S. Pat. No. 5,000,082 but without the maintenance problems noted above.

At least seven different in-line, aligned, rotary drives are contemplated here: (1) a rotary solenoid that has been modified by substituting the horizontal exterior tubular portion for the conventional rotary drive shaft; (2) an unmodified rotary solenoid that is linked axially in-line with a closed end of the tube to rotate the tube; (3) a modified pneumatical rotary actuator, or pneumatic rotary solenoid, in which the rotary drive shaft is replaced with the horizontal exterior tubular portion of the tubular valve; (4) an unmodified pneumatical rotary actuator, or pneumatic solenoid, which is axially linked to a closed end of the horizontal portion of the tube to rotate the tube; (5) a stepper motor, stepping motor, or step motor, that is modified to substitute the rotary drive shaft with the horizontal portion of the tubular dispense valve; (6) an unmodified stepper motor, stepping motor, or step motor, which is axially linked to the closed end of the horizontal portion of the tubular dispense valve; and (7) a unaltered rotary solenoid, electromechanical or pneumatic, or a stepper motor, linked to an intermediated portion of the horizontal tube between the water tank and the outlet by means of an axial drive.

Each of these different types of rotary drives are more robust than a reversing electrical motor controlled by external, cam operated microswitches and employ no external switches whatsoever. In the embodiments in which the devices are modified by having their rotary drive shafts replaced with the horizontal portion of the tubular valve, no external axial linkage is required and the axial, in-line power drive with the tubular valve may advantageously be produced as a subassembly to reduce the labor cost of final assembly of the brewer. In some of those that employ an unmodified axially aligned, in-line rotary power drive device, the distal exterior end of the rotary section is closed and passes entirely through the drain chamber, and the hot water is discharged into the drain chamber though a lateral hole in the portion of the tube located within the drain chamber. In these embodiments in which the rotary section passes entirely through the drain chamber and the rotary power drive is axially linked to the end of the or in which the connection to and intermediate portion of the rotary section is made by means of a bracket with an aligned rotary axis, the relative advantage of being able to replace the rotary power drive without the need to remove the tubular dispense valve is obtained and therefore may be preferred.

Figure 2:
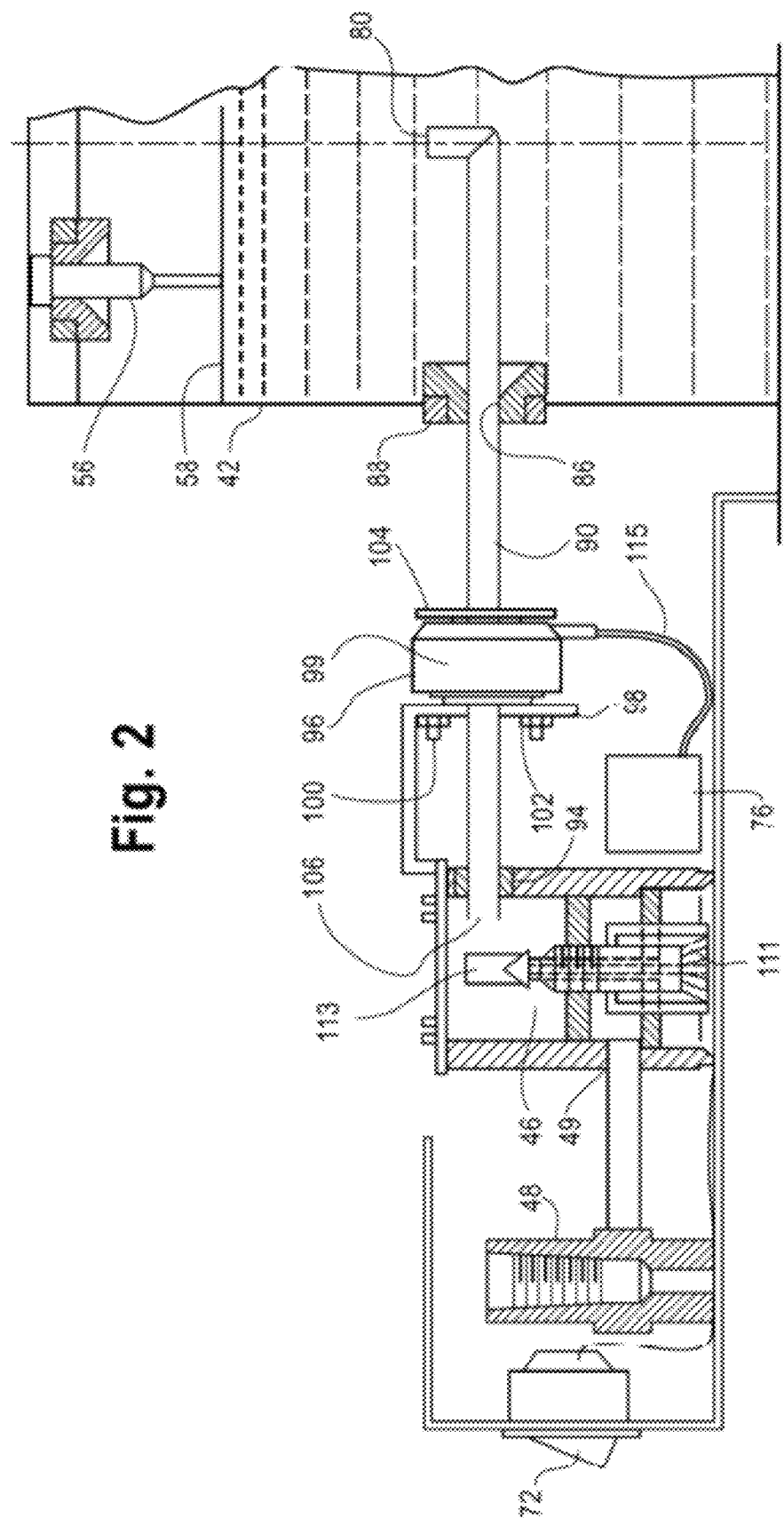
FIG. 2 is a portion if the sectional side view of the beverage brewer of FIG. 1 that has been enlarged to better illustrate the in-line, axial, power driven, open-ended tubular dispense valve assembly.

Still referring to FIGS. 1 and 2, the first embodiment employs a modified electromechanical solenoid 94 in which the horizontal, exterior, rotary, tubular section 90 of the tubular dispense valve 89 passes entirely through the center of the solenoid body and, in fact, functions as the rotary drive shaft of the solenoid 94. As best seen in FIG. 2, the rotary solenoid 94 has a generally cylindrical body 99 that is attached to a solenoid mounting member 98 located between the hot water tank 42 and the drain chamber 46. The attachment is by means of two identical threaded fasteners 100 extending axially outwardly from the rear of the cylindrical body 99 and through mating mounting holes in the solenoid mounting member 98 and then fastened by means of threaded nuts 102. At the front of the cylindrical body 99 is a round driven disk 104 that is mounted to the cylindrical body 99 for relative rotary movement along a central axis through a central hole in the disk 104. The exterior, horizontal, rotary, tubular section, or portion, 90 of the tubular valve 78 passes through, and is secured to, the central hole in this round driven disk and rotates with the disk 104.

When the solenoid is energized, the disk 104 rotates approximately 60 degrees from a home position to rotate the horizontal portion 90 and to thereby swing the valve inlet opening 80 from the valve closed position shown in FIG. 1 to the valve open position shown in FIG. 2. When the solenoid is intentionally de-energized at the end of the dispense period of the brew cycle and during periodic pauses in dispensing during the dispensing period when operating in a pulse-brew mode of operation, as described above, an internal coil spring contained within the body 99 automatically and rapidly returns the driven plate 104 to the home position and thereby returns the valve inlet opening 80 to the closed position shown in FIG. 1. Advantageously, should there be a failure of electrical power to the brewer 10, the solenoid 96 will automatically return the tubular dispense valve 78 to the closed position shown in FIG. 1, if it is not already in the closed position. The end outlet opening 106 of the rotary section 90 is within the drain chamber 46, and the hot water passes out of the rotary section 90 and through the end outlet opening 106 into the drain chamber 46 whenever the tubular valve 78 is opened. The water is first deflected by a splash member 113 and then falls down onto a distribution plate 111 and is uniformly distributed onto the layer of ground coffee within the brew basket 38 located beneath the distribution plate 111. The horizontal, rotary section 90 passes through a mating hole in the front side of the drain chamber 46 which, in turn, is surrounded by a water-tight, circular, sealing bearing 94 to prevent any leakage between the rotary section 90 and the mating hole. The rotary solenoid 96 is connected to a solenoid controller 76 which selectively energizes the rotary solenoid 96 through an electrical power lead 125 in response to actuation of the start switch if all of the other needed parameters for a brew cycle have been satisfied.

Figure 5:
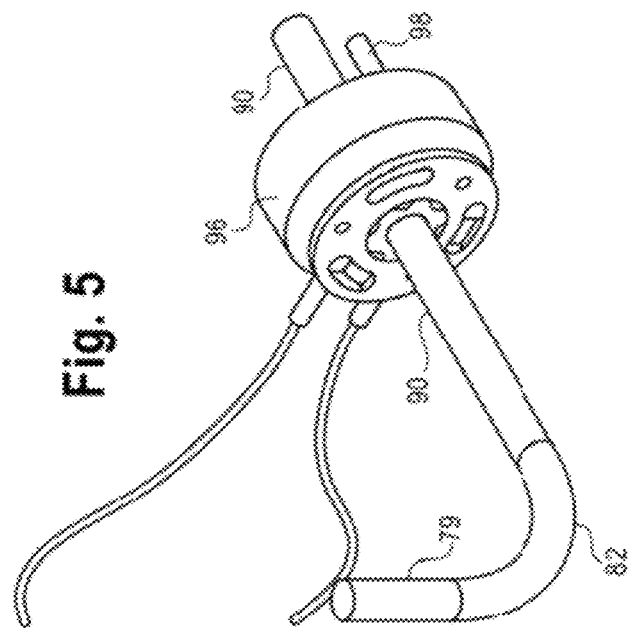
FIG. 5 is a perspective view of the modified rotary solenoid of FIG. 4 after full assembly.
Figure 4:
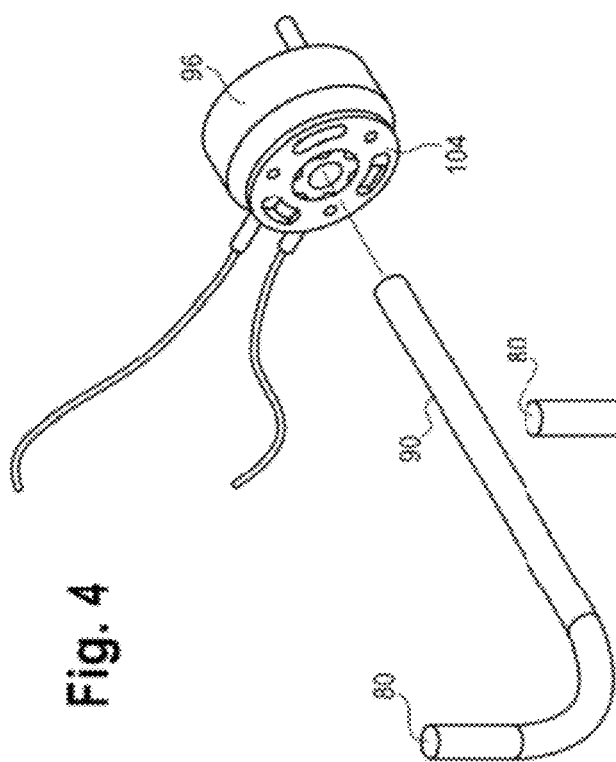
FIG. 4 is an exploded, perspective view of the modified rotary solenoid of FIGS. 1 and 2 in which a tubular dispense tube has been substituted for the customary solid rotary axle of a rotary solenoid.
Figure 6:
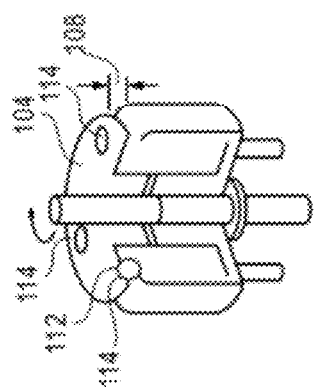
FIG. 6 is another perspective view of the modified rotary solenoid of FIG. 4 but viewed from the back of the solenoid.

Referring to FIGS. 4-6, the rotary solenoid is a compact and rugged direct current electromagnet. It is made of almost solid steel and copper so as to give maximum power output with minimum size and weight and fast action. When energized, the rotary armature plate, or disk, 104 snaps away from the home position by a predetermined number of degrees, preferably sixty degrees, to a distal rotary position and then stays in this position until de-energized. When de-energized, the disk 104 snaps back to the home position.

Figure 8:
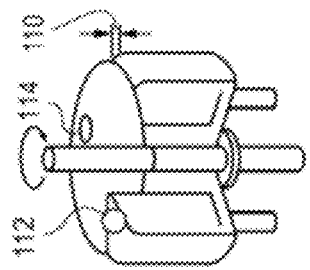
FIG. 8 is a perspective view, with a section broken away, of the unmodified rotary solenoid of FIGS. 3 and 7 when in the closed position, with the drive plate extending minimally outwardly from the body of the solenoid.
Figure 7:
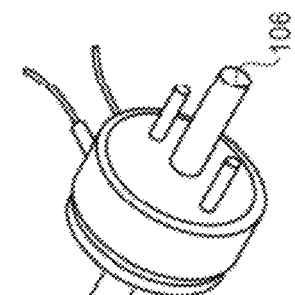
FIG. 7 is perspective view, with a section broken away, of the unmodified rotary solenoid of FIG. 3 when in the open position with the drive plate extended maximally outwardly from the body of the solenoid.

Referring to FIGS. 7 and 8, when rotating, the disk 104 also slightly moves along the axis away from the front end of the cylindrical body 99 from a distance 108 from the body shown in FIG. 7 to a distance 110 from the cylindrical body 99 shown in FIG. 8. The rotary solenoid armature disk 104 is supported by three stainless steel ball bearings 112 (only one shown) carried by the front end of the body 99. These ball bearings 112 travel around and down three mating inclined ball races 114. When power is applied, a powerful linear electromagnetic force pulls in the armature. Rotation continues until the balls have traveled to the deep ends of the races. The result is almost frictionless conversion from linear to rotary motion. When power is removed, the opposite motion results.

Advantageously, this slight axial movement moves the horizontal portions of the tubular valve 78 within the water-tight sealed bearings and thereby removes any calcification or liming that could otherwise result at the entrance to the seals and thereby cause leakage.

Referring now to FIG. 3, another embodiment of the brewer 10 is shown which is similar to the brewer of FIGS. 1-8, but in which the modified solenoid 96 with the tubular portion 90 having been substituted for the customary rotary shaft, is replaced by an unmodified, off-the-shelf rotary solenoid with its customary, solid, cylindrical rotary shaft such a Ledex™ Rotary Solenoid sold by Johnson Electric and shown and explained in their Apr. 1, 2006 Ledex™ Catalog, which is hereby incorporated by reference, and subsequent issues, which are hereby incorporated by reference and at their web site at www.ledex.com, which is hereby incorporated by reference. Reference may also be made to the literature and catalogs of other manufacturers of rotary solenoids. Also, the various characteristics of rotary solenoids are shown in U.S. Pat. Nos. 7,078,992; 6,078,236; 6,053,472; 5,322,606; 5,028,900; 4,959,629; 4,736,175; 4,496,134; 4,157,521; 4 4,151,499; 4,135,138 and 4,093,931, all of which are hereby incorporated by reference. The exact solenoid design depends upon the configuration in which it will be used, the limitations of space, the amount of torque required, an other engineering and business considerations and may be determined empirically based on the other features of the brewer or other drink maker or dispenser with which it may be used.

Referring to FIG. 3, the unmodified solenoid 115 is substantially the same as the modified rotary solenoid 96 and operates the same way except that it preferably has a customary solid rotary drive shaft 117. The drive shaft 117 extends a short way out from the rotary disk 104 and rotates moves axially with the rotary disk. The distal end of the drive shaft 117 is preferably attached by means of an internally threaded collar 116, FIG. 3, to a closed end 119 of the a closed-ended, horizontal, rotary tubular portion, or section, 118 of a closed ended, bent tubular dispense valve 120. The closed-ended dispense valve 120 is substantially identical to the open-ended dispense valve of FIGS. 1 and 2, except that the end 119 is closed and carries external thread for threaded attachment to the collar 116 and has a laterally facing valve outlet opening, or discharge hole, 121 that is located along the horizontal portion 118 at a position contained within the drain chamber 46. The horizontal portion passes entirely through the drain chamber 46 for axial, in-line attachment to the collar 116 and thereby to the solid rotary shaft 117. Thus, the back side of the drain chamber 46 has an opening for passage of the end of the horizontal portion 118 surrounded by which is a water-tight rotary seal 122. The back of the solenoid 115 is attached to a mounting bracket 124 integrally formed with or attached to the top 126 of the drain chamber 46 by means of the identical treaded fasteners 100 and matching threaded nuts 102.

Referring now to FIGS. 9-11 another embodiment of the beverage brewer 10 is shown in which the modified solenoid 96 of FIGS. 1-2 and 4-6 is replaced with a modified stepper motor 126. The stepper motor 126 is shown with its conventional solid rotary shaft 128, but in the brewer of FIG. 9 the stepper motor 126 has been modified by substituting the horizontal, rotary section 90 of the tubular dispense valve 78. Preferably, the stepper motor 126 is one such as described made by Microchip Technology Inc. such as shown and described in the 2004 publication AN907 written by Reston Condit and Dr. Douglas W. Jones, which is hereby incorporated by reference. Reference may also be made to U.S. Pat. Nos. 7,211,910 and 6,806,675 and the patents cited therein, all of which are hereby incorporated by reference. Manufacturers of stepper motors will also provide a mating stepper controller 128. Referring to FIG. 11, the stepper controller 126 includes a stepper motor drive circuit which is powered by a stepper motor power supply with a capacitive backup. In the event of power failure with the stepper motor in the valve open position, a capacitor that is charged when power is still present is used to provide power to the drive circuit 130 to automatically return the stepper motor to the valve closed position. A power loss sensor in the motor drive circuit actuates this emergency mode of operation to prevent the dispense valve 78 from remaining open in the event of electrical power loss.

Referring again to FIG. 3, in accordance with another embodiment of the brewer 10, the stepper motor 126 is employed without modification as shown in FIG. 10, and is substituted for the unmodified solenoid 115 with the stepper motor shaft 128 connected to the end of the horizontal, rotary section 118 to provide rotary drive thereto through an axial, in-line connection through a suitable coupling such as described above with reference to FIG. 3. The shaft 128 has an octagonal cross section that may be used with collar substituted for collar 116 with a mating, octagonal, female connector for receipt of the octagonal shaft 128, although the threaded collar 116 could also be used.

Referring now to FIGS. 12-14, another embodiment of the beverage brewer of the present invention is shown that is substantially identical to that described above with reference to FIGS. 1-2 and 4-6, and substantially identical to that described above with reference to FIGS. 9-11 except that a pneumatic rotary actuator, or "pneumatic solenoid", has been substituted for the modified solenoid 96 of FIGS. 1 and 2 or for the modified stepper motor 127 of FIG. 9. FIG. 13 shows a pneumatic rotary actuator 130 that is unmodified which has a customary solid, cylindrical rotary shaft 132 which rotates a preselected number of degrees whenever air pressure is applied to its interior through suitable pneumatic fittings (now shown) and automatically returns when air pressure is removed or negative pressure is applied. The modified pneumatic rotary actuator 134 is substantially identical to the unmodified pneumatic rotary actuator 132 except the solid rotary shaft has been replaced with the horizontal, rotary section 90 of the open-ended tubular dispense valve 78. In all other respects, the "pneumatic solenoid" 134 operates the same as the electrical solenoid 96 of FIGS. 1 and 2. The particular rotary actuator that is employed again depends on engineering and business consideration and the size and other features of the beverage brewer in which the it will be used, but a suitable rotary actuator can certainly be obtained from Rotomation, Inc. such as shown in their catalog, a few pages of which are attached hereto and hereby incorporated by reference, or from PHD, Inc., such as their Series 0180 Miniature Rotary Actuator shown in their catalog, which is hereby incorporated by reference, and as shown at their web site at www.phdinc.com/products/classic, which is hereby incorporated by reference. Reference may also be made to U.S. Pat. No. 4,193,337 and the patents cited therein, all of which are hereby incorporated by reference.

Referring to FIG. 14, the embodiment of the beverage brewer 10 shown in FIG. 12 in addition to the modified pneumatic rotary actuator 134 also has a pneumatic rotary actuator controller 136 that is connected to the rotary actuator 134 through pneumatic hoses 138 and 140. When pressure is applied to one of the hoses 138, the tubular portion 90 is quickly rotated to the open valve position and when pressure is applied to the other pneumatic tube and removed from the other, the tubular portion is automatically and quickly returned to the close valve position.

Referring to FIG. 14, the pneumatic rotary controller has a control circuit 142 that is actuates a condenser air pump 144 to pump air into a condenser tank 146 whenever the air pressure in the condenser tank 146 is sensed by the control circuit to be beneath a preselected minimum. When the control circuit senses that the air pressure is at a preselected maximum pressure than the condenser air pump 144 is turned off. When it is desired to actuate the pneumatic rotary actuator 134, the control circuit 142 selectively actuates the bipolar pneumatic valve 148 to selectively interconnect the pressure in the condenser tank with one of the pneumatic tubes 138 and 140 and disconnects the other.

Referring again to FIG. 3, in accordance with another embodiment of the brewer 10, just as with the unmodified stepper motor 126, the unmodified pneumatic rotary actuator 130 without modification, as shown in FIG. 13, may be employed as a substitute for the unmodified solenoid 115 with the pneumatic rotary shaft 132 being axially in-line connected to the end of the horizontal, rotary section 118 to provide rotary drive thereto. Connection is made through a suitable axial, in-line connection, such as through a suitable coupling collar as described above with reference to FIG. 3. The shaft may be threaded or otherwise carry a collar which can be employed by a suitable mating connector carried at the end of the horizontal, rotary section 118.

Figure 15:
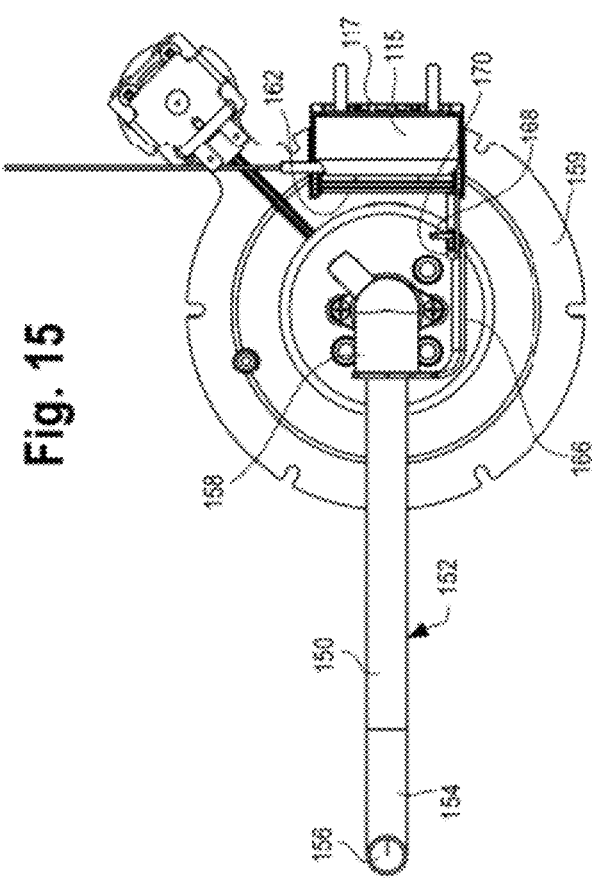
FIG. 15 is a plan view another embodiment of the invention in which the rotary solenoid is located behind the drain chamber and is attached to the dispense tube by means of a forward reaching L-shaped bracket that has one end attached to the perimeter of a rotor of the rotary solenoid.
Figure 16:
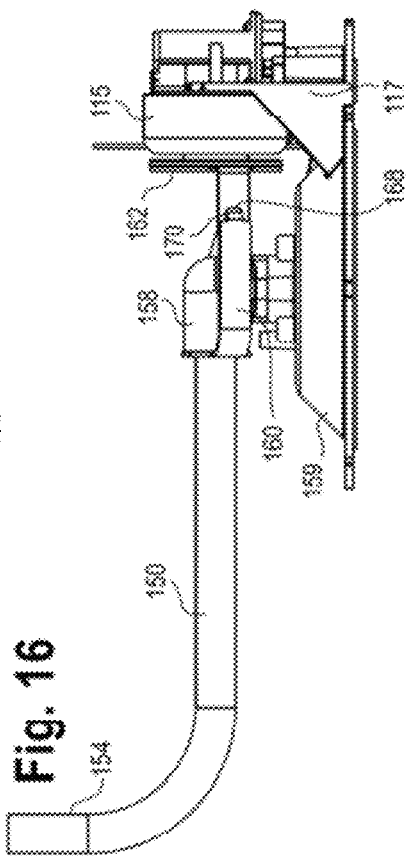
FIG. 16 is a side view of the embodiment of FIG. 15.
Figure 17:
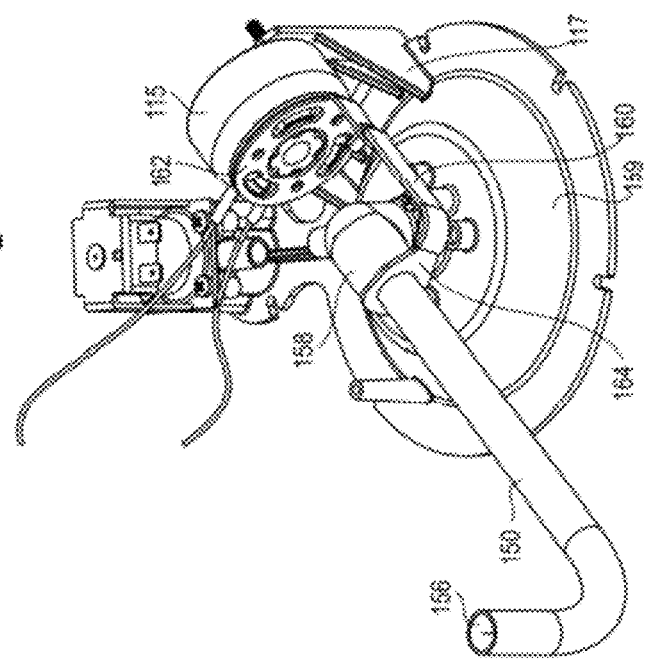
FIG. 17 is a perspective view of the embodiment of FIGS. 15 and 16.

Referring to FIGS. 15-17, disclosed in another tubular dispense assembly that employs an unmodified rotary solenoid 115 that is axially aligned with a horizontal section 150 of an L-shaped tubular dispense tube 152 that has a swinging section 154 with an inlet 156. The outlet is rotatably mounted to an inlet connector 158 attached to the top of a drain chamber cover 159 of a drain chamber such as shown in U.S. patent application Ser. No. 10/849,387, filed May 19, 2004 and entitled "Beverage Brewer with Spray Distribution Assembly and Method" by means of a durable, water tight, rotary bushing such as described above. The water entering the inlet connector falls through the drain chamber and onto a cascading spray dome for distribution onto the ingredient in the brew basket. The back of the rotary solenoid 115 is mounted to the top cover 159 of the spray dome by a mounting bracket 117 either attached to or integrally formed with the spray dome cover 159. The front of the rotary solenoid 115 is linked to the horizontal section ISO by means of an elongate bracket assembly with an L-shaped portion 160 that extends forwardly from a peripheral edge of a front rotor plate 162 of the solenoid 115 and attaches to the horizontal section 150 immediately in front of the connector 158. The connection is by means of a tubular, circular connector 164 that surrounds and snugly, circumferentially, frictionally engages the horizontal section 150. The tubular connector rotates about an axis that passes through the center of the horizontal section 150 and aligned with the axis of rotation of the rotary solenoid 115 to avoid any lateral stress. As best seen in FIGS. 15 and 16, the tubular connector is at the end of an L-shaped arm 166 that carries a releasable, rectangular, connector pin 168 located at an opposite end of the L-shaped arm 166. The connector pin 168 is slidably received within a mating mounting slot 170 formed in another straight forwardly extending arm 172 that is attached to the solenoid rotor plate 162. The pin 168 and slot 170 allows for relative longitudinal movement between the L-shaped arm 166 and the forwardly extending arm to preclude axial or lateral forces being applied to the horizontal section 150. Preferably, the rotary solenoid 115 has been altered by providing it with a rotor plate 162 that has the arm 172 integrally formed therewith One method of the present invention is the method of brewing freshly brewed beverage by performance of the steps of moving an open-ended tubular dispense valve from a closed position to an open position with an in-line axial power drive selected from one of the group of: a rotary solenoid, a stepper motor and a pneumatic rotary actuator, and the like, that has been modified as described above with the horizontal, rotary section functioning as the actual rotary shaft of the rotary drive and passing the hot water through the horizontal, rotary section to an open end contained within the drip chamber.

Another method of the present invention is the method of brewing freshly brewed beverage by performance of the steps of moving a close-ended tubular dispense valve from a closed position to an open position with an unmodified in-line axial power drive selected from one the group of a rotary solenoid, a stepper motor and a pneumatic rotary actuator, and the like, which is connected to a closed end of the horizontal, rotary section by means of an in-line connector and passing hot water into the drip chamber when the closed ended tubular dispense valve is in the open position through a laterally facing hole in the side of the horizontal, rotary section that is contained within the drip chamber. While the tubular body is indicated as being generally L-shaped, it should be appreciated that other non-straight or curved configurations could be successfully employed.

The other methods of the invention include all those methods that are inherent from the above detailed description and as set forth in the claims While particular embodiments of the brewer of the present invention have been disclosed in detail with reference to rotary in-line axial drives of a rotary solenoid, a stepper motor and a pneumatic rotary actuator, or pneumatic solenoid, it should be appreciated that other rotary drives that have similar characteristics could be used in their stead. These characteristics are relative simplicity, ruggedness or robustness relative to the electric motor employed in the beverage brewer of U.S. Pat. No. 5,000,082. Also, importantly, these rotary devices, unlike the reversible electric motor, do not require any external positional sensors operated by a cam in order to control the degree of rotation. Instead, they inherently rotate a preselected number of degrees when actuated and automatically return the same number of degrees when deactuated, such as the rotary solenoid and the pneumatic rotary actuator, or which rotate a preselected number of degrees based strictly and inherently on the number of control pulses that are provided from the controller with no need for feedback. Thus, other like devices may be employed should new devices evolve or otherwise discovered and appreciated for their like qualities.

It should be appreciated that while in the embodiments described above, there is a direct, axial, inline coupling between the axial inline powered drive mechanism, i.e. one of the solenoids or the stepper motor, the axial inline powered drive mechanism could employ an intermediate gear linkage between the exterior rotary section and the solenoid or stepper motor so long as the final gear connected to the rotary section has an axis of rotation that is aligned with the rotary axis of the rotary section even if the axis of rotation of the solenoid or stepper motor is offset. The advantages of inline driving may be obtained even with a different type of drive mechanism while the advantages of a rotary solenoid or stepper motor in eliminating positional sensors may obtained without inline driving of the tubular valve.

While the embodiments have all been shown with customary brew baskets being used to hold the beverage ingredient, it should be appreciated that the invention is applicable to other types of brewers in which the means for holding the ingredient may consist of a closed chamber or other device for holding the ingredient, and the term "brew basket" as employed in this specification and in the claims, should be understood to not only mean a conventional brew basket as shown, but also any other ingredient container to which water must be added to make a beverage including a container for temporarily seeping beverage ingredient with water or a container in which iced tea abstract may be mixed with water to make fresh for seeping the ingredient with the water for a preselected time period.

The invention claimed is:

1. In an electrical beverage brewer having, a start brew switch, a controller responsive to the start switch to operate a brew cycle, a water tank and a brew basket for holding beverage ingredient, the improvement being a water dispense system for selectively passing water from the water tank to the brew basket, comprising:
   a rotary tubular valve with an elongate, non-straight, tubular body with an elongate interior swinging section joined at a non-straight angle to an exterior rotary section, said interior swinging section having an inlet opening and said rotary section having a central axis of rotation, and an outlet opening in fluid communication with the inlet opening and;
   means for mounting the tubular body to the water tank for rotation about an axis aligned with the rotary section, between an open position in which the inlet is in a relatively elevated position and a closed position at a lower elevation relative to the open position, said tubular body being mounted with the swinging section and inlet located within the water tank and at least a part of the rotary section located without the water tank with the outlet in fluid communication with the brew basket to pass water to the brew basket; and
   an inline, rotary, drive mechanism with a rotor having a rotary axis aligned with the central axis of rotation of the rotary section and axially linked, inline, with the rotary section to axially drive the rotary section and thereby move the swinging section between the open position and the closed position without applying lateral forces to the rotary section.

2. The electrical beverage brewer of claim 1 in which
   the exterior rotary section extends entirely through the center of the inline, rotary drive mechanism, and
   the outlet is an outlet opening located on a side of the rotary solenoid that is opposite the interior swinging section.

3. The electrical beverage brewer of claim 1 in which the outlet is an axially facing opening at an end of the exterior rotating section.

4. The electrical beverage brewer of claim 1 including
   a drain chamber with
      a water tight inlet for rotatable connection with, and receipt of water from, the exterior rotary section, and
      a bottom opening for distributing the water into the brew basket, and in which
   the exterior rotating section passes laterally through the water tight inlet and extends into the drain chamber with the with the outlet located within the drain chamber.

5. The electrical beverage brewer of claim 4 in which
   the outlet opening is defined by an opening at a distal end of the exterior rotary section that is located within the drain chamber,
   the exterior rotating section passes entirely through the inline, rotary, drive mechanism and functions as a rotor, and
   the inline, rotary, drive mechanism is located at a position between the drain chamber and the water tank.

6. The electrical beverage brewer of claim 4 in which
   the inline rotary drive mechanism is an electromechanical rotary solenoid,
   said rotary solenoid
      automatically rotating the exterior rotary section through an arc of preselected size when energized to move the swinging section to the open position, and
      automatically returning the exterior rotary section through the same arc to move the swinging section to the closed position when not energized.

7. The electrical beverage brewer of claim 1 in which
   the inline rotary drive mechanism is an electromechanical rotary solenoid,
   said rotary solenoid
      rotating the exterior rotary section through an arc of preselected size when energized to move the swinging section to the open position, and
      automatically returning the exterior rotary section through the same arc to move the swinging section back to the closed position when not energized.

8. The electrical beverage brewer of claim 1 including a drain chamber with
   a bottom open to the brew basket and surrounded by a closed wall and covered by closed top, and
   a rotary inlet connector for receipt of the exterior rotary section to establish fluid communication of the outlet within the drain chamber between the closed top and the open bottom.

9. The electrical beverage maker of claim 1 in which the inline rotary drive mechanism is a rotary solenoid that has been modified by substituting the exterior rotary section for a conventional rotary drive shaft of the solenoid.

10. The electrical beverage maker of claim 1 in which the inline, rotary drive mechanism is energized by the controller in response to manual actuation of the start switch to move the swinging section to the open position.

11. The electrical beverage brewer of claim 10 in which the non-straight angle is approximately ninety degrees.

12. The electrical beverage brewer of claim 1 in which the inline, rotary drive mechanism is energized by the controller in response to manual actuation of the start switch to move the swinging section to the open position.

13. For use in an electrical beverage brewer having, a start brew switch, a controller responsive to the start switch to operate a brew cycle, a water tank and a brew basket for holding beverage ingredient, the improvement being a water dispense system for selectively passing water from the water tank to the brew basket, a method of brewing comprising the steps of:
   mounting a generally bent dispense tube to a water tank for rotation between a closed position in which an inlet of the tube is in a relatively elevated, close position, and an open position at a lower elevation relative to the closed position, said tubular body being mounted with the swinging section and inlet located within the water tank and at least part of the rotary section defining an exterior rotating section located without the water tank with the outlet in fluid communication with the brew basket to pass water to the brew basket;
   rotating the exterior rotating section with a powered inline, rotary, drive mechanism with a rotary axis aligned with a central axis of rotation of the rotary section and axially linked, inline, with the rotary section to axially drive the rotary section and thereby move the swinging section between the open position and the closed position without applying lateral forces to the rotary section;
   holding the rotary section stationary with the swinging section in the open position to pass a preselected amount of water to the brew basket through the bent dispense tube from the water tank to the brew basket; and
   after the preselected quantity of water has been passed to the brew basket, rotating the exterior rotary section with the powered, inline, rotary, drive mechanism to axially drive the rotary section and thereby move the swinging section from the open position to the close position without the application of lateral forces to the rotary section.

14. The brewing method of claim 13 in which the step of rotating the swinging section to the closed position includes the steps of
   manually actuating a start brew switch, and
   energizing the inline, rotary drive mechanism in response to actuation of the start switch.

15. The brewing method of claim 13 in which the step of passing the water to the brew basket includes the step of passing the water out of a laterally facing outlet of the exterior rotating section.

16. The brewing method of claim 13 in which the step of passing includes the step of passing water from an outlet of the exterior rotary section into a drain chamber located above the brew basket to which the exterior rotary section is rotatably mounted.

17. The brewing method of claim 13 in which the steps of rotating are performed with a rotary solenoid with an axis of rotation that is aligned with a central axis of rotation of the exterior rotary section.

18. In an electrical beverage brewer having a water tank and a brew basket for holding beverage ingredient, the improvement being a water dispense system for selectively passing water from the water tank to the brew basket, comprising:
   a rotary tubular valve with an elongate, non-straight, tubular body with an elongate interior swinging section joined to an exterior rotary section, said interior swinging section having an inlet opening and said rotary section having a central axis of rotation and an outlet opening in fluid communication with the inlet opening;
   means for mounting the tubular body to the water tank for rotation about an axis aligned with the rotary section, between a closed position in which the inlet is in a relatively elevated position and an open position at a lower elevation relative to the closed position;
   said tubular body being mounted with the swinging section and inlet located within the water tank and at least a part of the rotary section located without the water tank with the outlet in fluid communication with the brew basket to pass water to the brew basket; and
   means for automatically driving the rotary section with a solenoid by energizing the solenoid, said solenoid imparting a preselected fixed amount of rotary movement to the exterior rotary section in one direction to move the inlet from the closed position to the open position and imparting a preselected fixed amount of rotary movement in an opposite direction to move the inlet from the open position to the closed position to pass water to the brew basket from the water tank.

19. The electrical beverage brewer of claim 18 in which the automatically driving means includes means for selectively automatically inline, axially, driving the rotary section with a rotary member having a rotary axis aligned with the axis of rotation and imparting an inline, axial, opposite rotary drive to the exterior rotary section to return the inlet to the open close position.

20. The electrical beverage brewer of claim 18 in which the automatically inline driving means is responsive to actuation of a start brew switch to move the inlet to the open position.

21. The electrical beverage brewer of claim 18 in which the automatically inline driving means is a rotary solenoid.

22. The electrical beverage brewer of claim 18 in which the automatically inline driving means has a stator and the exterior rotary section extends into the stator and functions as, and interacts with, the stator as a rotor.

23. The electrical beverage brewer of claim 22 in which the exterior rotary section passes entirely through the stator.

24. The brewing method of claim 18 including the step of axially moving the rotary section within watertight seals of rotary bearings through which the rotary section passes to remove calcification and liming from entrances to the seals.

25. For use in an electrical beverage brewer having a water tank and a brew basket for holding beverage ingredient, the improvement being a method of dispensing water from the water tank to the brew basket, comprising the steps of:
   providing a rotary, tubular valve with an elongate, non-straight, tubular body with an elongate interior swinging section joined to an exterior rotary section, said interior swinging section having an inlet opening and said rotary section having a central axis of rotation, and an outlet opening in fluid communication with the inlet opening; and mounting the tubular body to the water tank for rotation about an axis or rotation aligned with the rotary section, between a closed position, in which the inlet is in a relatively elevated position, and an open position at a lower elevation relative to the closed position; and automatically driving the rotary section with a solenoid by energizing the solenoid, said solenoid imparting a preselected fixed amount of rotary movement to the exterior rotary section in one direction to move the inlet from the closed position to the open position when energized, and imparting a preselected fixed amount of rotary movement in an opposite direction to move the inlet from the open position to the closed position to pass water to the brew basket from the water tank when the energization is terminated.

* * * * *